Figure 5:
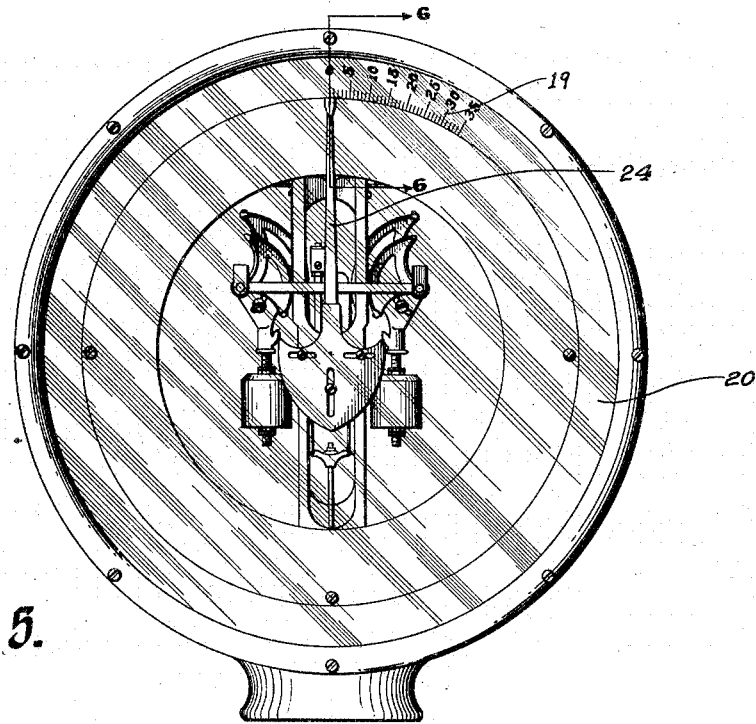
Figure 6:
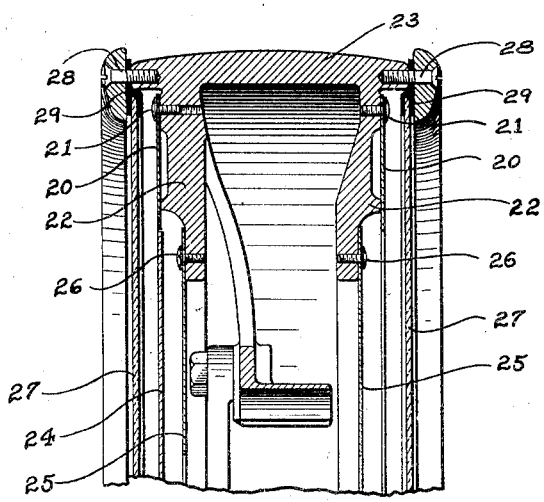

Oct. 30, 1928.
O. C. REEVES
1,689,686
INDICATOR
Filed Sept. 28, 1922
2 Sheets-Sheet 1
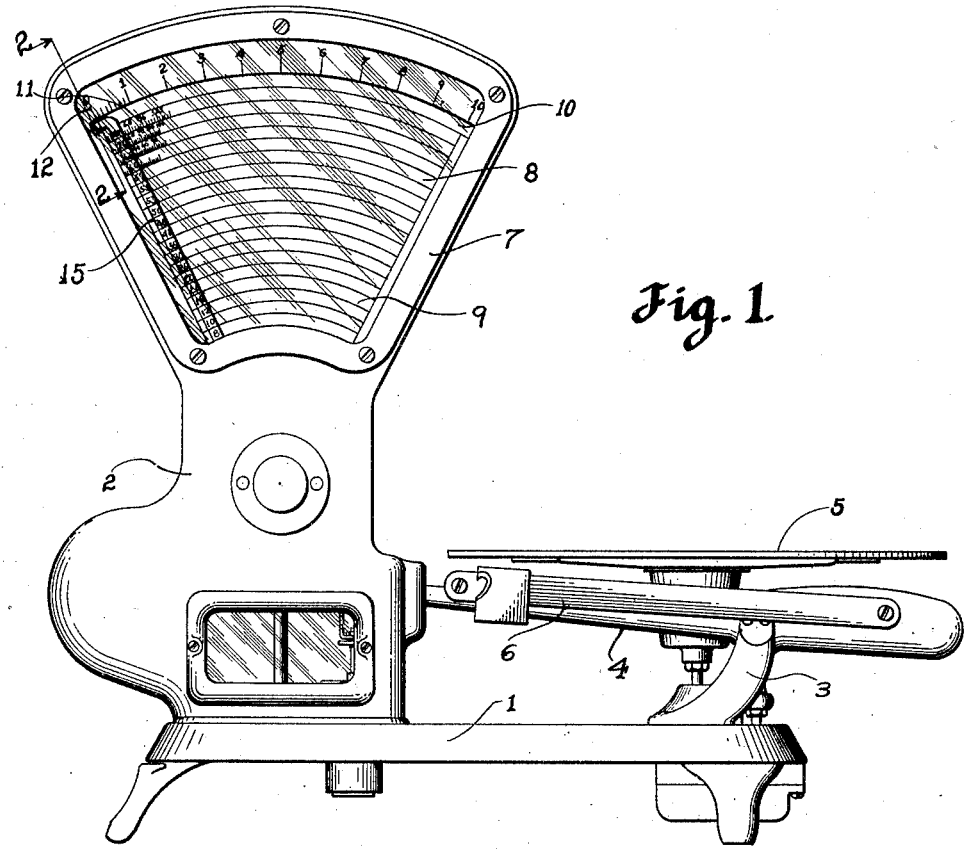
Fig. 1
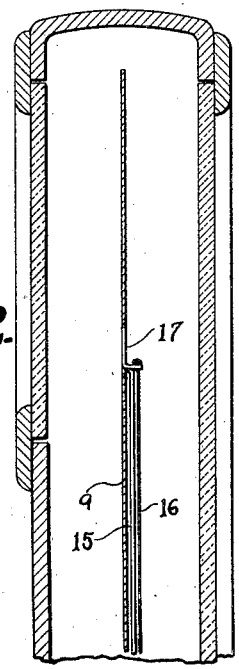
Fig. 2
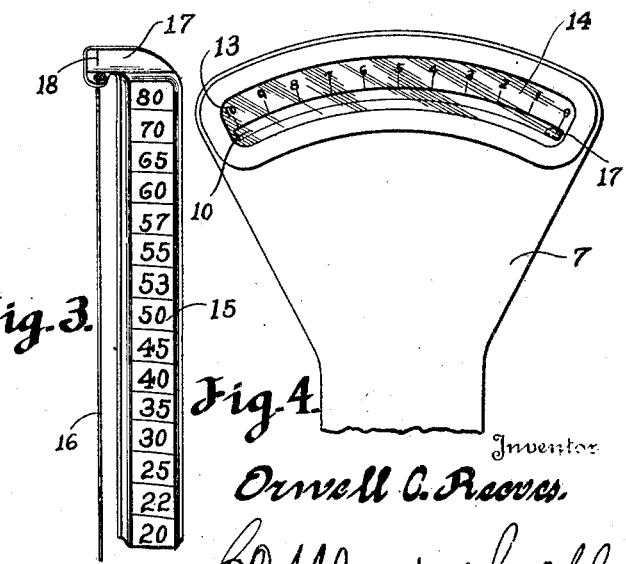
Fig. 3
Fig. 4
Inventor
Orwell C. Reeves.
By C. D. Marshall
Attorney Oct. 30, 1928.

O. C. REEVES

INDICATOR

Filed Sept. 28, 1922

1,689,686

2 Sheets-Sheet 2

Inventor
Orwell C. Reeves.
By C. D. Marshall
Attorney

Patented Oct. 30, 1928.

1,689,686

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

INDICATOR.

Application filed September 28, 1922. Serial No. 591,028.

This invention relates to indicators, and particularly to indicating devices for weighing scales, and one of its principal objects is to provide a device in the use of which errors due to parallax which occur because of changes in the reader's position are avoided.

Another object is the provision of a chart and an indicator hand co-operating therewith, the parts being so constructed and arranged as to facilitate reading indications thereon.

Another object is the provision of a chart and indicator hand so constructed and arranged as to minimize the possibility of errors caused by the charts and hands coming into contact.

Another object is the provision of a device of this kind in which the indication may be read from either the front or the rear side of the chart and in which there is no liability of lack of identity of the front and rear indications.

Still another object is the provision of an indicating device for a weighing scale having a chart and hand so arranged that the portions of the chart and hand which co-operate to indicate weights lie in the same plane and may be read from either the front or rear of the scale, while the portions of the chart and hand which co-operate to indicate computed values are visible only from the front of the chart.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a fan type weighing scale embodying some of the features of my invention;

Figure II is an enlarged fragmentary cross section taken substantially on the line II—II of Figure I;

Figure III is an enlarged fragmentary elevation showing a part of the indicator hand removed from the scale;

Figure IV is a fragmentary rear elevational view showing the indicating mechanism as it appears when viewed from the rear of the scale;

Figure V is a front elevational view showing an indicator hand and dial employed with another type of scale and embodying certain features of my invention; and Figure VI is an enlarged fragmentary sectional view taken substantially on the line VI—VI of Figure V.

Referring to the drawings in detail, and particularly to Figures I to IV inclusive, the base 1 of the scale supports at one end an upright housing 2 and at its opposite end a fulcrum stand 3 upon which is supported a lever 4 which carries a commodity-receiving platter 5 and a beam 6. The nose of the lever 4 extends into the housing and is suitably connected with the load-counterbalancing mechanism (not shown). The upper end 7 of the housing 2 is fan-shaped and is provided, as shown in Figure I, with a glazed window 8 through which an indicating chart 9 is visible. An arcuate slot 10 extends transversely of the chart 9 nearly from side to side, and the portion of the chart below the slot is occupied by concentric rows of graduations and value computations 11 such as are commonly employed on computing charts of this type. The portion of the chart above the arcuate slot 10 bears a series of weight figures and graduations 12 on its front face and a similar series of figures and graduations 13 on its rear face, the figures on the front face of the chart reading from left to right, while those on the rear face of the chart read from right to left and are visible through a rear window 14, as indicated in Figure IV.

The indicator hand 15 which co-operates with the chart 9 bears a series of prices, as shown in Figure III, each price of the series being arranged to swing over an appropriate row of computations on the chart 9, the hand being provided with an indicating wire 16 to indicate values by its condition of registration with graduations on the chart. The tip 17 of the hand 15 is offset, as indicated in Figures II and III, so that it lies in the plane of the chart and swings within the arcuate slot 10 and is, therefore, visible from either side of the scale. On each side of the tip 17 of the hand is a radially-extending mark 18 which serves as a pointer to indicate the weight on the scale by its condition of registration with the graduation above it.

Owing to the fact that the portions of the surface of the hand bearing the marks 18 lie in the same planes as the surface of the chart, the apparent indication of weight will be the same regardless of the position of the observer, and errors due to parallax are thereby avoided. Since no part of the chart lies back of this portion of the hand, there is no liability of its coming into contact with the chart in moving to indicating position. The device also provides an indication visible from the rear of the scale which is always identical with that visible from the front of the scale, and this result is obtained without the use of an additional indicator hand or a hook passing over the top of the chart and thereby avoids the liability, which always attends the employment of such devices, of their rubbing against the chart and introducing inaccuracies into the operation of the scale.

In the form of device shown in Figures V and VI, the weight figures and computations 19 are placed upon a comparatively narrow ring 20 which is secured by means of screws 21 against milled surfaces of inwardly-extending flanges 22 which are integral with the housing 23. Buckling of the chart, which sometimes causes trouble in other constructions, is easily avoided in the construction illustrated. The indicator hand 24 swings, as is shown in Figure VI, in the plane of the chart 20, so that there is no possibility of error due to parallax. In order to facilitate reading of the indication by making the location of the hand instantly apparent, an additional ring 25 is secured by means of screws 26 to the flange 22, so that it lies in a plane at the rear of the hand 24, the distance between the hand 24 and ring 25 being sufficiently great to avoid any liability of interference between the hand 24 and ring 25 due to warping of the hand or buckling of the ring. Such warping or buckling cannot, of course, bring the hand 24 into contact with the ring 20. The ring 25 and the tip of the hand 24 may, if desired, be contrastingly colored. The ring 25 may, for example, be colored a dull black, while the tip of the hand 24 and the ring 20 are colored white.

In describing the form of device shown in Figures V and VI, only the obverse dial has been considered. It will be understood, however, that the scale may be equipped with a reverse dial identical with that above described. The dials are protected by windows 27 which are held in place by suitable retaining screws 28 and shock absorbing gaskets 29, the windows, retaining rings and gaskets forming, however, no part of the present invention.

While it will be apparent that the illustrated embodiments of my invention herein disclosed are well calculated to adequately fulfill the objects primarily stated, it is to be understood that the invention is susceptible to modification, variation and change within the spirit and scope of the subjoined claims.

Having described my invention, I claim:

1. In a device of the class described, in combination, a relatively movable chart and indicator hand, said chart being divided into two portions by an arcuate opening, said indicator hand having a part with its surface lying in the plane of a surface of the outer of said portions and a part lying before the inner of said portions, the outer portion of said chart bearing weight indicia, and the inner portion thereof bearing value computations.

2. In a device of the class described, in combination, a fixed chart having an arcuate slot therein, and an indicator hand movable over the portion of said chart lying below said slot, said indicator hand having an offset tip lying within said slot with its surfaces in the planes of the surfaces of the chart and co-operating with the portion of said chart above the slot.

3. In a device of the class described, in combination, a housing, a chart therein, said housing having a front and a rear window, said chart having an arcuate slot, an indicator hand having a portion swinging over the front of said chart and visible through the front window of said housing, and an offset tip lying in said slot with its surfaces in the planes of the surfaces of said chart and visible through the front and rear windows of said housing.

4. In a device of the class described, in combination, a housing, a chart therein, said housing having a front and a rear window, said chart having an arcuate slot, value computations on one side of the portion of said chart lying below said arcuate slot, said value computations being visible through the front window of said housing, weight indicia on both sides of the portion of said chart lying above said slot, said weight indicia being visible through the front and rear windows of said housing, an indicator hand having a portion swinging over the front of said chart and visible through the front window of said housing, said portion of the indicator hand bearing price indicia, and an offset tip lying in said slot with its front and rear surfaces respectively in the planes of the front and rear surfaces of said chart and visible through the front and rear windows of said housing.

ORWELL C. REEVES.